United States Patent
Ito et al.

(10) Patent No.: US 7,619,654 B2
(45) Date of Patent: Nov. 17, 2009

(54) CAMERA AND LENS DEVICE

(75) Inventors: Yoshihiro Ito, Saitama (JP); Keiji Ohkubo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 510 days.

(21) Appl. No.: 11/337,651

(22) Filed: Jan. 24, 2006

(65) Prior Publication Data

US 2006/0176373 A1    Aug. 10, 2006

(30) Foreign Application Priority Data

| Feb. 7, 2005 | (JP) | ............................. 2005-030184 |
| Feb. 7, 2005 | (JP) | ............................. 2005-030185 |
| Sep. 28, 2005 | (JP) | ............................. 2005-282615 |

(51) Int. Cl.
*H04N 5/228* (2006.01)
(52) U.S. Cl. ............................. 348/208.12; 348/208.11; 348/208.99; 348/345; 396/73
(58) Field of Classification Search ............ 348/208.12, 348/208.99, 335
See application file for complete search history.

(56) References Cited

U.S. PATENT DOCUMENTS

| 4,887,107 | A * | 12/1989 | Nakamura et al. ............. 396/75 |
| 6,944,395 | B2 * | 9/2005 | Hara ............................. 396/52 |
| 7,043,154 | B2 * | 5/2006 | Nomura ........................ 396/73 |
| 7,209,165 | B2 * | 4/2007 | Ishikawa ................ 348/208.99 |
| 2003/0156832 | A1 * | 8/2003 | Nomura et al. ................ 396/72 |
| 2004/0179127 | A1 * | 9/2004 | Omiya et al. ................ 348/345 |
| 2004/0227844 | A1 * | 11/2004 | Sakamoto ..................... 348/357 |
| 2005/0140793 | A1 * | 6/2005 | Kojima et al. .......... 348/208.99 |
| 2005/0168585 | A1 * | 8/2005 | Uenaka et al. ......... 348/208.99 |
| 2005/0200740 | A1 * | 9/2005 | Kim et al. ..................... 348/335 |
| 2005/0248661 | A1 * | 11/2005 | Stanvely et al. ........ 348/208.99 |

FOREIGN PATENT DOCUMENTS

| JP | 9-146137 A | 6/1997 |
| JP | 2003-149723 A | 5/2003 |
| JP | 2004-233917 A | 8/2004 |
| JP | 2004-274242 A | 9/2004 |

* cited by examiner

*Primary Examiner*—David L Ometz
*Assistant Examiner*—Quang V Le
(74) *Attorney, Agent, or Firm*—Sughrue Mion, PLLC

(57) ABSTRACT

A taking lens consists of first to third lens groups. The second lens group is held in a lens frame that is coupled through an arm to a supporting shaft, and is able to rotate about the supporting shaft, to move the second lens group in a circular direction in a plane perpendicular to an optical axis of the taking lens. As a movable lens barrel retreats into a camera body, the lens frame rotates to remove the second lens group from an inserted position inserted in an optical path of the taking lens to a removed position set out of the optical path. The arm is provided with an actuator that causes the lens frame to move in a lengthwise direction of the arm. Because the movement in the circular direction includes a component that is perpendicular to the lengthwise movement of the arm, it is possible to move the lens frame and thus the second lens group in any directions in the perpendicular plane to the optical axis, in order to cancel a deviation of an optical image that result from a camera shake.

7 Claims, 9 Drawing Sheets

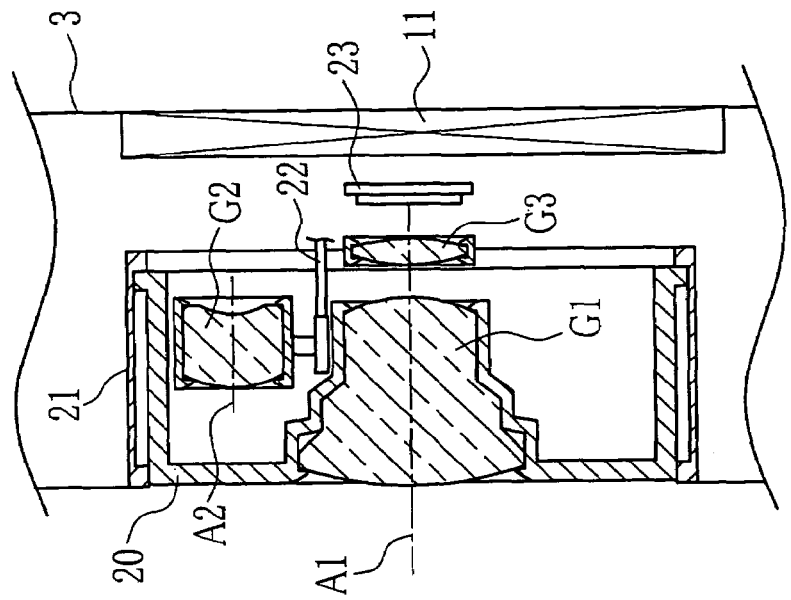
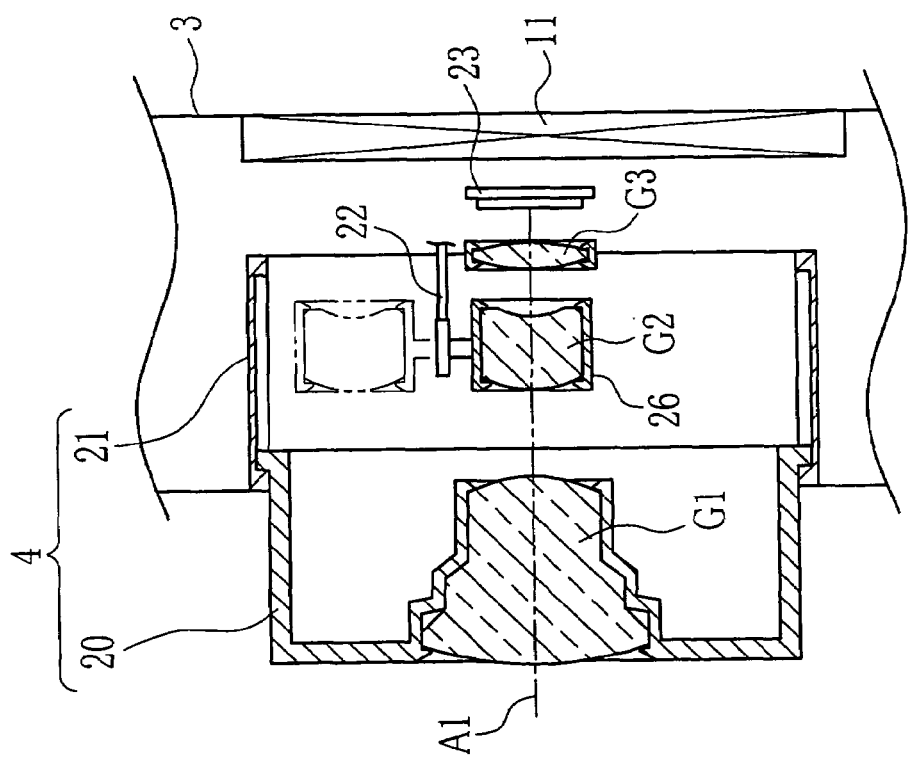

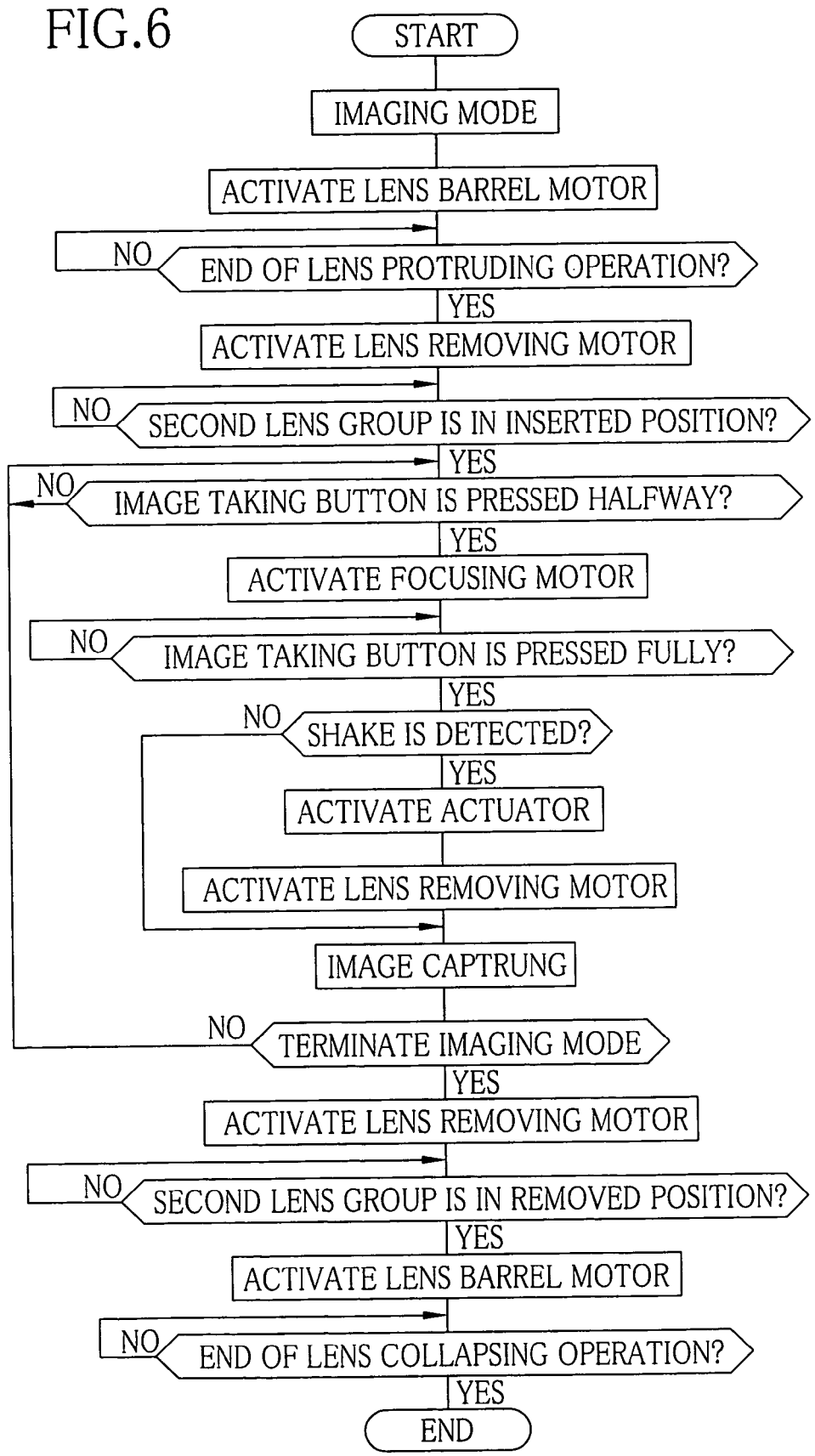

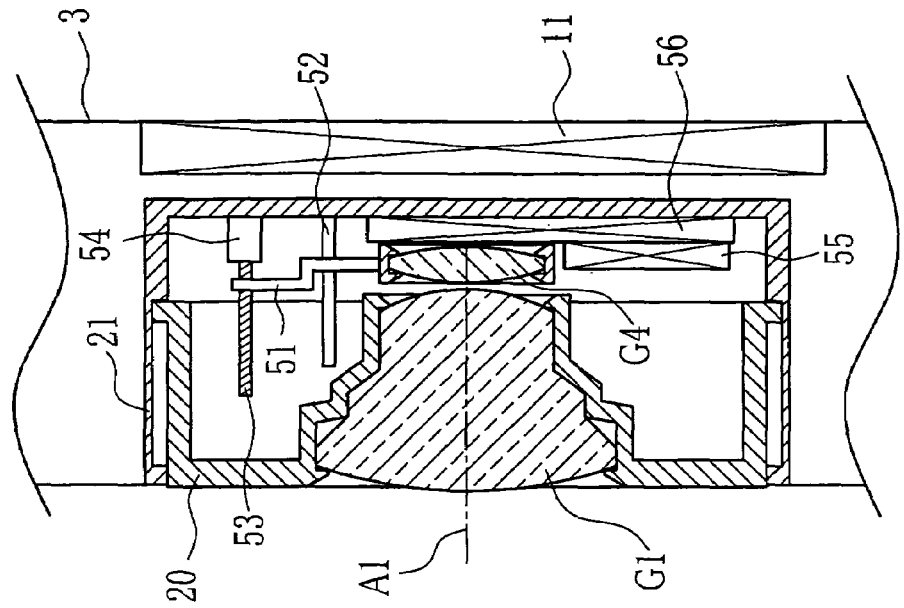
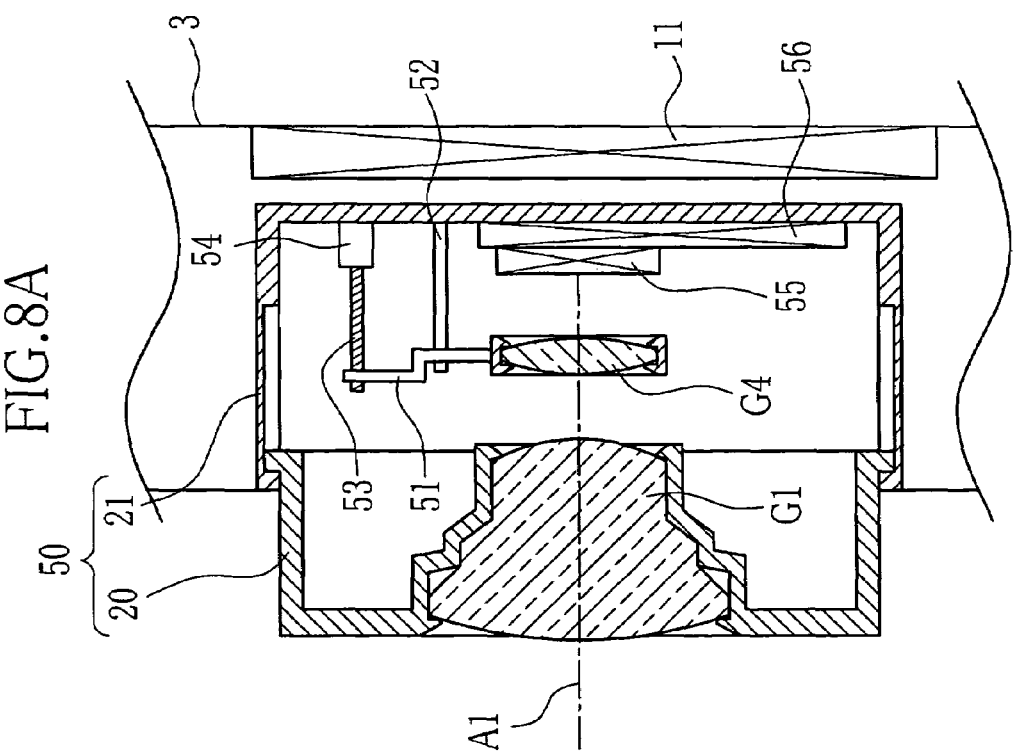

CAMERA AND LENS DEVICE

FIELD OF THE INVENTION

The present invention relates to a camera and a lens device, wherein a movable member is removed from an optical axis of a taking lens while the taking lens is retreating into a camera body, so that the camera is improved in compactness.

BACKGROUND ARTS

Collapsible cameras that can collapse their lens barrel into their camera body have been known. As the lens barrel, which protrudes from the front of the camera body while the camera works, is collapsible, the collapsible camera is handy and convenient for carrying it about. Also the lens barrel is prevented from striking against something and being damaged. Especially, since digital cameras, which have recently been widely spread, are required to have high-quality performances and compactness as well, the digital cameras generally have a lens device whose lens barrel protrudes to a certain extent for zooming and the like, and is collapsible into a rest position.

Japanese Laid-open Patent Application Nos. 2003-149723 and 2004-233917 disclose a camera, wherein an element of a taking lens is removed from an optical path of the taking lens while a lens barrel of the taking lens is collapsed into a camera body, so that other lens elements are held in a room that is provided by removing the lens element. Thereby, a requisite length of the collapsed lens barrel is shortened, so that the camera body needs a less thickness for accommodating the collapsed lens barrel. The lens element removable from the optical path of the taking lens is placed close to an image forming surface, and is movable about an axis that is parallel to an optical axis of the taking lens, in a plane perpendicular to the optical axis.

Meanwhile, a camera having a device for compensating for the camera shake has been known, for example, from Japanese Laid-open Patent Application No. Hei 9-146137, wherein a part of a taking lens is moved in a plane perpendicular to an optical axis of the taking lens, so as to prevent damaging an image even when the camera is shaken or jiggled at the exposure. Otherwise, the image would be blurred because of the camera shake. In an example, a lens is moved in an opposite direction to the shaking direction of the camera.

In a digital camera disclosed in Japanese Laid-open Patent Application No. 2004-274242, a CCD image sensor is moved in a plane perpendicular to an optical axis of a taking lens, by use of two actuators, which displace the CCD in two directions orthogonal to each other, e.g. vertical and horizontal directions. In this digital camera, the CCD image sensor is moved when a shake sensor detects a camera shake at the exposure, so as to correct a deviation of an image of a subject on the CCD image sensor, and thus prevent blurring or other image deteriorations that may be caused by the camera shake.

If a mechanism for removing a part of a taking lens to collapse a lens barrel compactly, and a mechanism for moving the taking lens or an image sensor perpendicularly to an optical axis so as to compensate for the camera shake are both built in a camera, the internal structure of the lens barrel would be complicated, which may enlarge the camera size or raise the camera cost.

SUMMARY OF THE INVENTION

In view of the foregoing, a primary object of the present invention is to provide a camera that can remove a part of a taking lens to collapse a lens barrel compactly, and also compensate for the camera shake without enlarging the lens barrel, complicating the structure or raising the cost. The present invention also has an object to provide a lens device suitable for such a camera.

To achieve the above and other objects, a camera of the present invention comprises a lens optical system having a plurality of lens elements; a lens moving device for moving at least one of the plurality of lens elements along an optical axis of the lens optical system, toward an object side to elongate a total length of the lens optical system in a lens protruding operation, or toward an image side to shorten the total length of the lens optical system in a lens collapsing operation; a shake detection device for detecting a shake of the camera; a movable device movable in a perpendicular plane to the optical axis of the lens optical system, the movable device being used for compensating for a deviation of an optical image formed through the lens optical system, the deviation resulting from the shake of the camera; a first control device for moving the movable device to an inserted position inserted in an optical path of the lens optical system with the lens protruding operation, or to a removed position out of the optical path with the lens collapsing operation; and a second control device that calculates an amount and direction of movement of the movable device necessary for canceling the deviation of the optical image when the shake detection device detects the shake, the second control device causing the movable device to move by the calculated amount in the calculated direction.

It is to be noted that the above mentioned shake includes any momentary one-way movement whose interval is irregular. The shake means an accelerated movement or a camera shake that is caused by pressing a shutter button or image capturing button if a shutter speed is lower than a camera shake limit speed, under which the taken picture is likely to blur unless the camera is placed stably.

According to a preferred embodiment, the movable device is a compensation lens that constitutes a component of the lens optical system in the inserted position, and the second control device comprises a rotary displacing device for displacing the compensation lens in a circular direction about a pivotal point that is located outside the lens optical system, and a linear displacing-device for displacing the compensation lens linearly in a radial direction to the circular direction. The rotary displacing device preferably doubles as the first control device.

According to another preferred embodiment, the movable device is an image sensor that takes the optical image as an electric signal, and the second control device comprises first and second linear displacing devices that cause the image sensor to move in two directions which are orthogonal to each other in the perpendicular plane to the optical axis. It is preferable that the first linear displacing device, which causes the movable device to move in one of the two orthogonal directions to each other, doubles as the first control device.

A lens device of the present invention comprises a lens optical system having a plurality of lens elements; a lens moving device for moving at least one of the plurality of lens elements toward an object side to elongate a total length of the lens optical system in a lens protruding operation, or toward an image side to shorten the total length of the lens optical system in a lens collapsing operation; and a compensation lens provided in the lens optical system and movable in a perpendicular plane to an optical axis of the lens optical system, wherein the compensation lens is moved to an inserted position inserted in an optical path of the lens optical system with the lens protruding operation, or to a removed position out of the optical path with the lens collapsing operation, and is also moved within the inserted position by an amount in a direction when the amount and the direction are calculated as necessary for canceling a deviation of an optical image formed through the lens optical system, the deviation resulting from a shake of the lens optical system.

According to the present invention, the device for moving the compensation lens or the image sensor into or out of the optical path of the lens optical system, e.g. a taking lens, may double as the device for compensating for the deviation of the optical image, as resulting from the camera shake. Therefore, the present invention permits simplifying the structure of a lens barrel, making the lens barrel compact and economical.

Since the compensation lens may be displaced in the circular direction by the rotary displacing device as well as in the radial direction to the circular direction by the linear displacing device, it becomes possible to use the same mechanism for moving the compensation lens between the inserted position and the removed position and for shifting the compensation lens to compensate for the deviation of the optical image that is caused by the camera shake. This embodiment makes it possible to minimize the mechanism for moving the compensation lens, in comparison with a case where the compensation lens is moved only linearly for the camera shake compensation as well as for insertion and removal into and out of the optical path.

Where the movable device is the image sensor, and the image sensor is moved in two linear directions which are orthogonal to each other, the image sensor may be removed from or moved into the optical path just by activating one of the two linear displacing devices. In that case, the other linear displacing device may be a simpler mechanism that displaces the image sensor in a smaller amount. So the lens barrel may have a simple internal structure, which permits minimizing the lens barrel.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein:

FIGS. 3A and 3B show fragmentary sectional views illustrating a lens device of the digital still camera;

FIG. 6 is a flow chart illustrating an operation sequence in an imaging mode of the digital still camera;

FIGS. 8A and 8B are fragmentary sectional views illustrating a lens device of a digital still camera according to a third embodiment;

DESCRIPTION OF THE PREFERRED EMBODIMENTS

Figure 1:
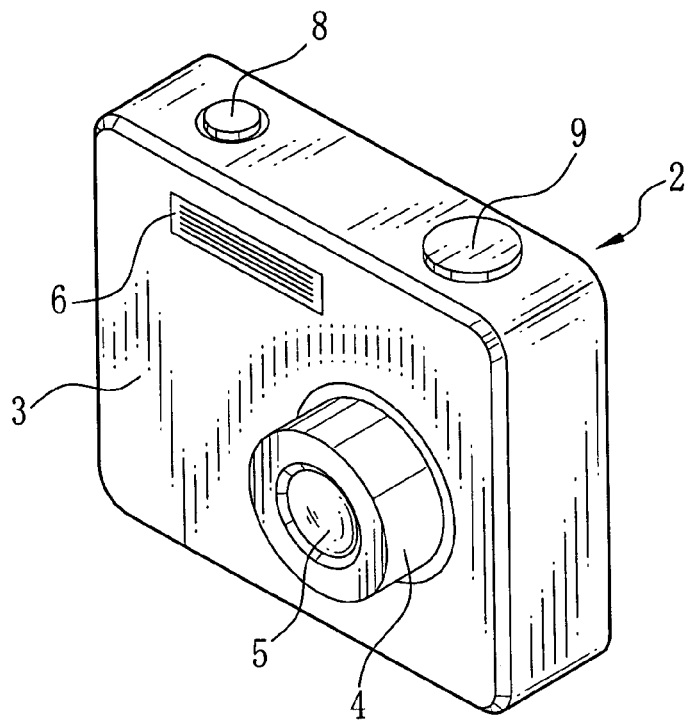
FIG. 1 is a front perspective view of a digital still camera embodying the present invention.

A digital still camera 2 shown in FIG. 1 is provided with a lens barrel 4 that holds a taking lens 5. The lens barrel 4 protrudes from a front surface of a camera body 3 to an active position when the digital still camera 2 is powered on. When the digital still camera 2 is turned off, the lens barrel 4 is moved back into a rest position where a front face of the lens barrel 4 is substantially aligned with the front surface of the camera body 3. A flash projector 6 automatically projects light when a detected subject brightness is low, so as to make up for the lack of subject brightness.

The digital still camera 2 has on its top a control dial 8 and an image taking button 9. The control dial 8 is manipulated to power the digital still camera 2 on and off, and switch over between an imaging mode and a reproduction mode and a set-up mode. The control dial 8 is switched to one of four positions that correspond to the power-off, the imaging mode, the reproduction mode and the set-up mode respectively.

When the control dial 8 is switched from the power-off position to any of other three positions, the digital still camera 2 is powered on. When the control dial 8 is switched to the imaging mode, the lens barrel 4 protrudes toward the active position. The reproduction mode is for displaying captured images. When the control dial 8 is switched to the set-up mode position, the user can change imaging resolution, turn automatic-flash on or off, control white balance and set up other imaging conditions.

The image taking button 9 may be pressed down in two steps, that is, halfway and full. When the image taking button 9 is pressed halfway, the digital still camera 2 carries out focusing. When the image taking button 9 is pressed further to the full, an image is captured.

Figure 2:
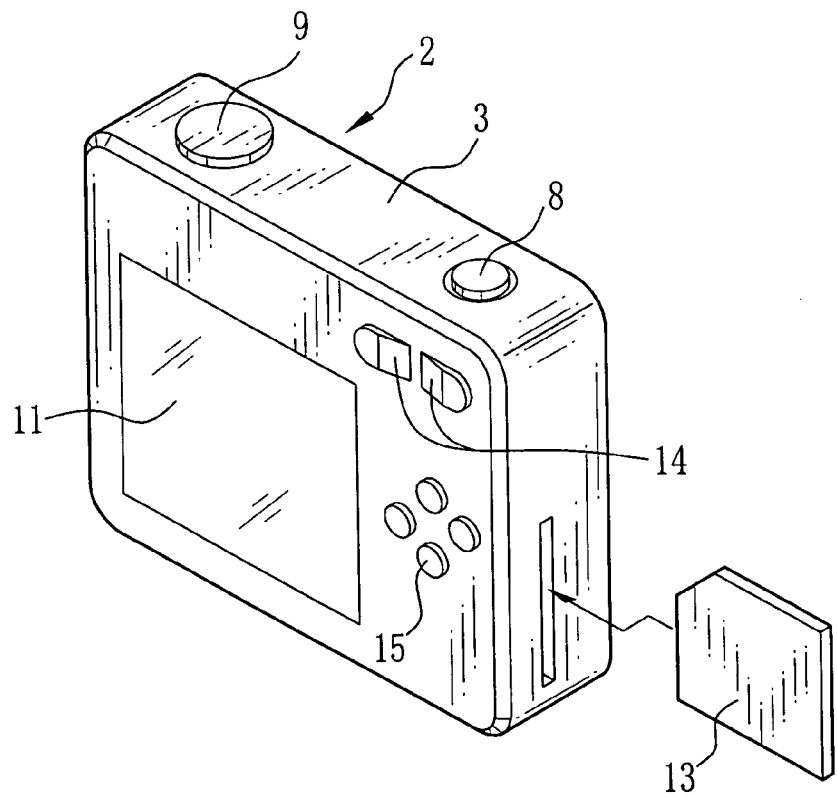
FIG. 2 is a rear perspective view of the digital still camera of FIG. 2.

As shown in FIG. 2, the digital still camera 2 has a liquid crystal display (LCD) panel 11 on its back. The LCD panel 11 functions as an electronic viewfinder in the imaging mode, to display live-view images that are presently imaged. In the reproduction mode, the LCD panel 11 displays a still image that is recorded as image data on a memory card 13. The memory card 13 is put in a memory card slot 12 that is provided on one side of the digital still camera 2.

An electronic zoom button 14 is disposed at an upper right side of the LCD panel 11. The electronic zoom button 14 consists of a zoom-in button and a zoom-out button, to change the imaging magnification electronically. Concretely, as the zoom-in button is pressed, a center area of a captured still image is cropped out and displayed as a pseudo zoom image that looks as if it was captured at a larger magnification. To set the magnification back to the original, the zoom-out button is pressed. A cursor button 15 is disposed below the electronic zoom button 14, and is operated mainly in the set-up mode to switch over the various set-up items.

As shown in FIG. 3, the lens barrel 4 consists of a movable lens barrel 20 as movable back and forth and an immovable lens barrel 21. The camera body 3 consists of a first lens group G1 held in the movable lens barrel 20, a second lens group G2 held rotatably about a pivot shaft 22 that extends in parallel to an optical axis A1 of the taking lens 5, and a third lens group G3 that moves along the optical axis A1 for focusing. The second lens group G2 function as a correction lens. A CCD image sensor 23 is disposed behind the taking lens 5 in a perpendicular plane to the optical axis A1. The CCD image sensor 23 converts an optical image of a subject, which is formed through the taking lens 5, into electric image signals.

As the movable lens barrel 20 protrudes forward, the second lens group G2 rotates about the shaft 22 to move into between the first lens group G1 and the third lens group G3, where an optical axis A2 of the second lens group G2 coincides with the optical axis A1 of the taking lens 5. As the movable lens barrel 20 retreats, the second lens group G2 rotates about the shaft 22 to move out of an optical path of a light bundle that travels from the subject through the first lens group G1. As a result, the first lens group G1 can be set back into a position where an image side surface of the first lens group G1 is placed closer to an image plane as compared to an image side surface of the second lens group G2. Accordingly, in the rest position of the movable lens barrel 20, as shown in FIG. 3B, the distance from an object side surface of the first lens group G1 to an image side surface of the third lens group G3 is less than the total thickness of the first to third lens groups G1 to G3. The movable lens barrel 20 has a radius that is approximately equal to a sum of a radius of the first lens group G1 and a diameter of the second lens group G2.

Figure 4:
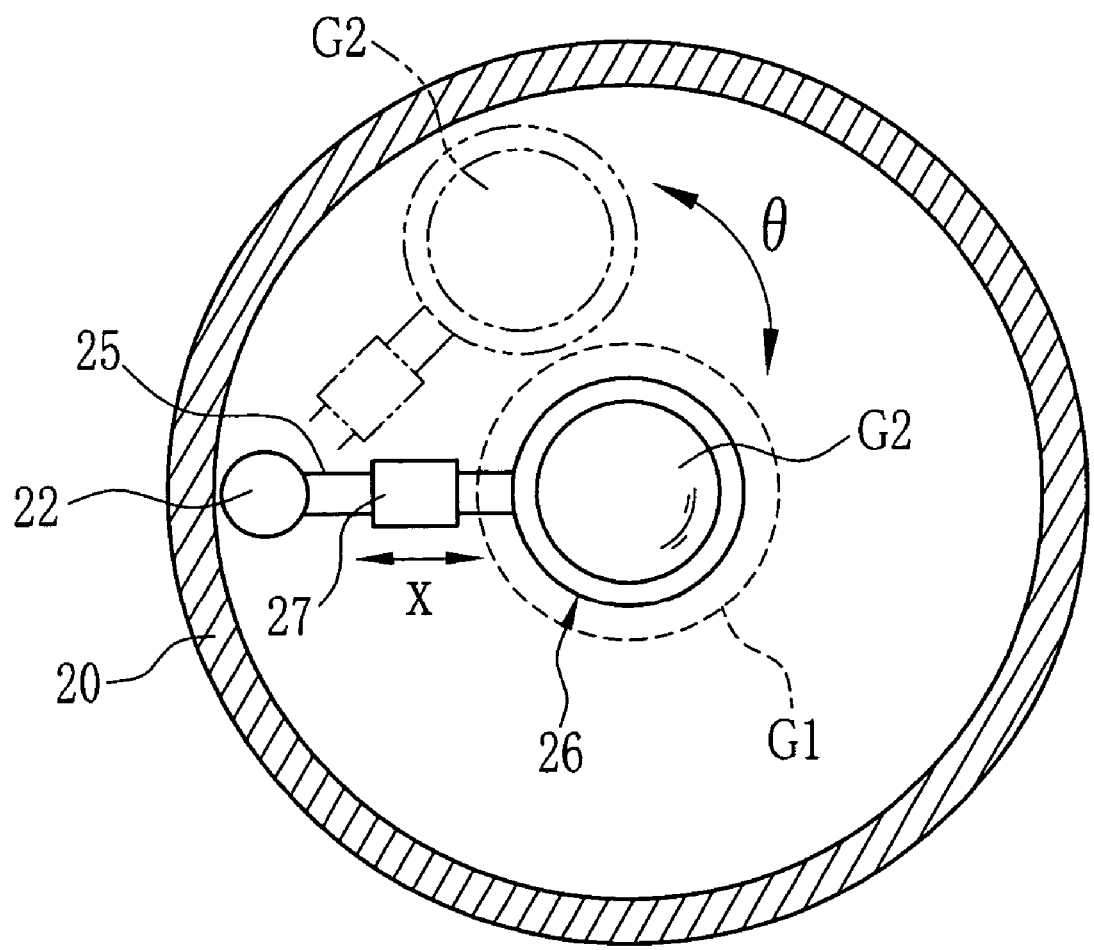
FIG. 4 is a front view of a second lens group of the lens device of FIG. 3.

As shown in FIG. 4, the second lens group G2 is held in a lens frame 26 having an arm 25 that extends orthogonal to the shaft 22. The arm 25 is provided with an actuator 27 that displaces the lens frame 26 in a lengthwise direction of the arm 25, as shown by an arrow X in FIG. 4. The lens frame 26 is also moved in a circular direction about the shaft 22, as show by an arrow θ, through an angle of about 45 degrees. Thereby, the lens frame 26 is moved between an inserted position where the second lens group G2 is inserted in the optical path of the taking lens 5, and a removed position where the second lens group G2 is out of the optical path. Because the circular movement in the θ direction includes a displacement in a perpendicular direction to the linear movement in the X direction, the lens frame 26 and thus the second lens group G2 can move in any directions in a perpendicular plane to the optical axis A1. For example, by composing the circular movement in the θ direction and the linear movement in the X direction, the lens frame 26 can be moved merely in the perpendicular direction to the X direction. The displacement of the lens frame 26 in the X direction by the actuator 27 can be so small in comparison with the displacement in the circular direction θ, that the actuator 27 cannot remove the second lens group G2 from the optical path.

Figure 5:
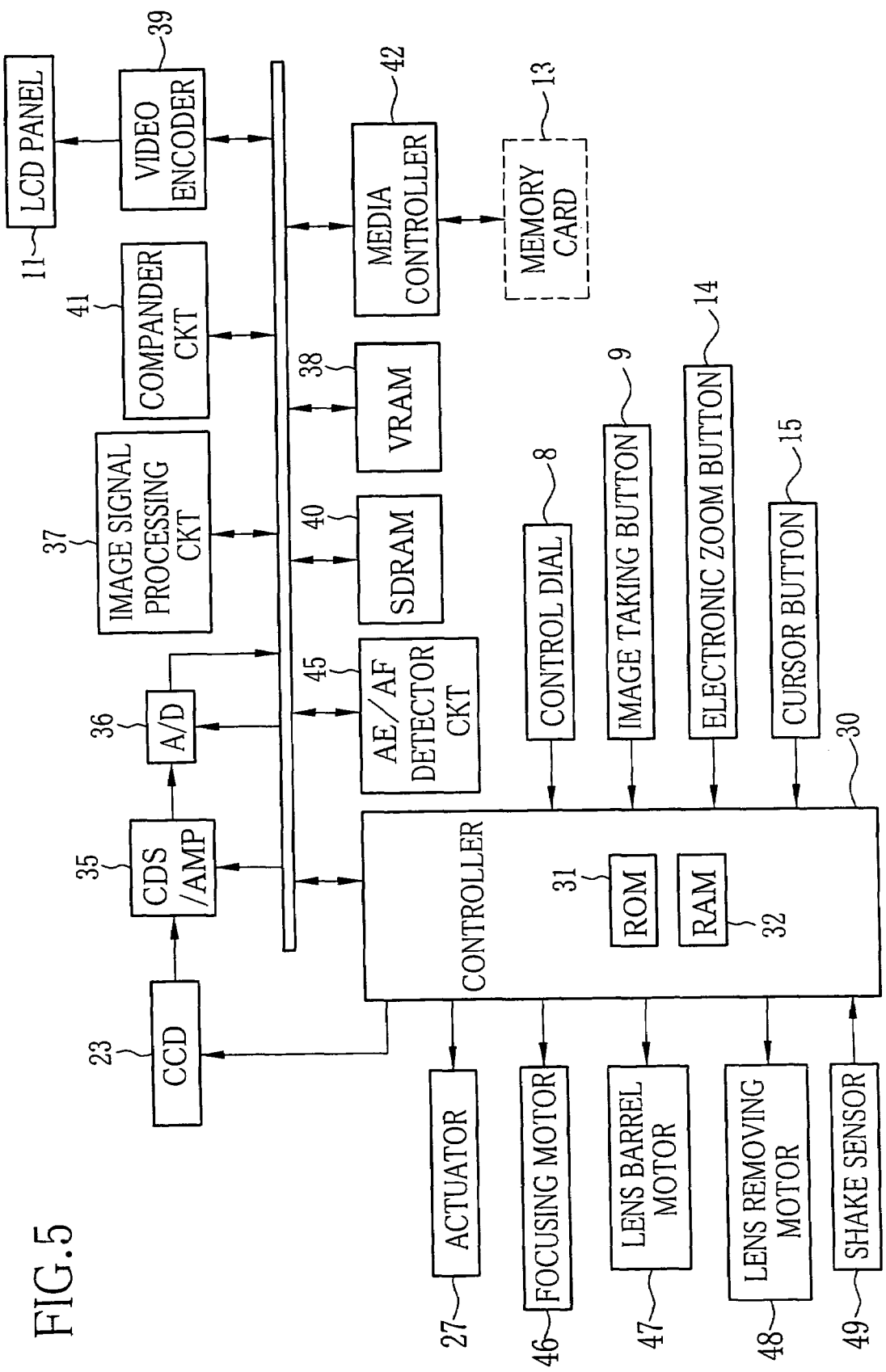
FIG. 5 is a block diagram illustrating an internal structure of the digital still camera.

In FIG. 5, a controller 30 is provided with a CPU that executes a sequence program stored in a ROM 31, and controls respective components of the digital still camera 2 in accordance with control signals entered through the control dial 8, the image taking button 9 and the electronic zoom button 14. A RAM 32 is a work memory that is used by the controller 30 to execute the sequence program.

A CDS/AMP circuit 35 consists of a correlating double sampling (CDS) circuit and an amplifier (AMP). The CDS circuit generates color separated image signals R, G and B from the image signals output from the CCD image sensor 23, and the amplifier amplifies the image signals R, G and B. An A/D converter 36 converts the analog image signals from the CDS/AMP circuit 35 into a digital form. The digitalized image signals are fed to the image signal processing circuit 37.

The image signal processing circuit 37 processes the digitalized image signals for gradation conversion, white-balance correction, gamma correction and the like, and then converts the processed image signals into Y/C signals. In the imaging mode, before the image taking button 9 is pressed, the image signal processing circuit 37 processes the image signals roughly for the image processing, makes the YC conversion, and writes them as image data temporarily in a VRAM 38. A video encoder 39 converts the image data as written in the VRAM 38 into composite signals for displaying live-view images on the LCD panel 11. When the image taking button 9 is pressed fully to capture a still image, the image signals are processed fully for the image processing and then converted into the Y/C signals in the image signal processing circuit 37, and are written as the captured image data in an SDRAM 40.

A compander circuit 41 compresses the captured image data as written on the SDRAM 40 into a predetermined compressed format, e.g. JPEG format, to generate an image file. The compressed image file is written on the memory card 13, or a storage medium, through a media controller 42. The compander circuit 41 also expands the compressed image file as it is read out from the memory card 13 in the reproduction mode, in order to display the reproduced image on the LCD panel 11.

An AE/AF detector circuit 45 executes an automatic exposure detection process (AE detection) and an automatic focus detection process (AF detection). In the AE detection process, a proper exposure value is derived from brightness data of individual pixels of the image signals as obtained through the CCD image sensor 23, and a gain of the amplifier of the CDS/AMP circuit 35 is decided. In the AF detection process, an in-focus position of the third lens group G3 is determined based on the contrast of the image. The AE detection process includes a process for deciding whether to project a flash light from the flash projector 6 or not.

A focusing motor 46 gives a driving force to move the third lens group G3 along the optical axis Al under the control of the controller 30. The controller 30 controls the focusing motor 46 with reference to the detection result of the AF detection process of the AE/AF detector circuit 45, so as to move the third lens group G3 to a position where the contrast of the image becomes the sharpest. A lens barrel motor 47 gives a driving force to move the movable lens barrel 20 forward from the camera body 3, and a driving force to move the movable lens barrel 20 back into the camera body 3.

A lens removing motor 48 drives the lens frame 26 through the shaft 22 to move the second lens group G2 between the removed position out of the optical path and the inserted position into the optical path in the perpendicular plane to the optical axis A1. The lens removing motor 48 is activated to move the second lens group G2 while the movable lens barrel 20 is in the protruded position. A shake sensor 49 detects any shake of the digital still camera 2 caused by some external force, and inputs a shake detection signal to the controller 30, which represents direction and magnitude of the detected shake. Upon receipt of the shake detection signal, the controller 30 drives the actuator 27 and the lens removing motor 48 to move the second lens group G2 in the perpendicular plane to the optical axis A1, so as to cancel or offset the deviation of the optical image of the subject on the photoelectric conversion surface of the CCD image sensor 23, the deviation resulting from the shake.

Now the operation of the digital still camera 2 will be described with reference to the flow chart of FIG. 6.

When the digital still camera 2 is set in the imaging mode by turning the control dial 8, the digital still camera 2 is powered on. The controller 30 activates the lens barrel motor 47 to drive the movable lens barrel 20 to protrude forward from the camera body 3. With the movable lens barrel 20, the first lens group G1 is moved toward the object side. When the movable lens barrel 20 accomplishes the forward movement, the controller 30 drives the lens removing motor 48 to rotate the lens frame 26 about the shaft 22 to move the second lens group G2 into the optical path.

When the second lens group G2 is inserted in the optical path, the controller 30 drives the CCD image sensor 23 to output the image signals from the optical image of the subject that is formed through the taking lens 5 on the photoelectric conversion surface of the CCD image sensor 23. Thus, an activating process in the imaging mode is accomplished, and the digital still camera 2 comes to a standby condition waiting for an image capturing operation. During the standby condition, the image of the subject taken through the CCD image sensor 23 is displayed as a live-view image or camera-through image on the LCD panel 11.

When the image taking button 9 is pressed halfway, the controller 30 activates the AE/AF detector circuit 45 to detect a subject brightness from the image of the subject taken through the CCD image sensor 23, and adjust the gain of the CDS/AMP circuit 35. At the same time, the controller 30 drives the focusing motor 46 to move the third lens group G3 along the optical axis A1 to determine the in-focus position where the contrast of the image becomes the sharpest, while checking the contrast of the image through the AE/AF detector circuit 45.

When the image taking button 9 is pressed to the full, the controller 30 checks if any shake has occurred in the digital still camera 2 by checking whether the controller 30 receives the shake detection signal from the shake sensor 49 or not. If no shake is detected, the image data of the image captured through the CCD image sensor 23 at the moment the image taking button 9 is fully pressed is written on the SDRAM 40. The image data written on the SDRAM 40 is then sent to the compander circuit 41, to be written as a compressed image file on the memory card 13 through the media controller 42.

On the other hand, if the controller 30 receives the shake detection signal when the image taking button 9 is fully pressed, the controller 30 calculates a driving amount of the actuator 27 and a driving amount of the lens removing motor 48 based on the direction and magnitude of the shake which are represented by the shake detection signal. Then the controller 30 drives the actuator 27 and the lens removing motor 48 to move the second lens group G2 in the perpendicular plane to the optical axis A1, so as to reduce the deviation of the optical image on the photoelectric conversion surface of the CCD image sensor 23. Thereafter, the controller 30 write the image data on the SDRAM 40, so the image data is compressed by the compander circuit 41 and, thereafter, written on the memory card 13.

To terminate the imaging mode, the control dial 8 is turned to the power-off position. Then the controller 30 starts a termination process of the imaging mode, wherein the lens removing motor 48 is driven to move the second lens group G2 from the inserted position in the optical path of the taking lens 5 to the removed position out of the optical path. When the second lens group G2 comes to the removed position, the controller 30 drives the lens barrel motor 47 to move the movable lens barrel 20 back into the camera body 3. Since the second lens group G2 has been moved to the removed position where the second lens group G2 does not interfere with the first lens group G1, the first lens group G1 can move close to the front of the third lens group G3. Therefore, the movable lens barrel 20 can retreat till its front face becomes substantially flat to the front surface of the camera body 3.

Figure 7A:
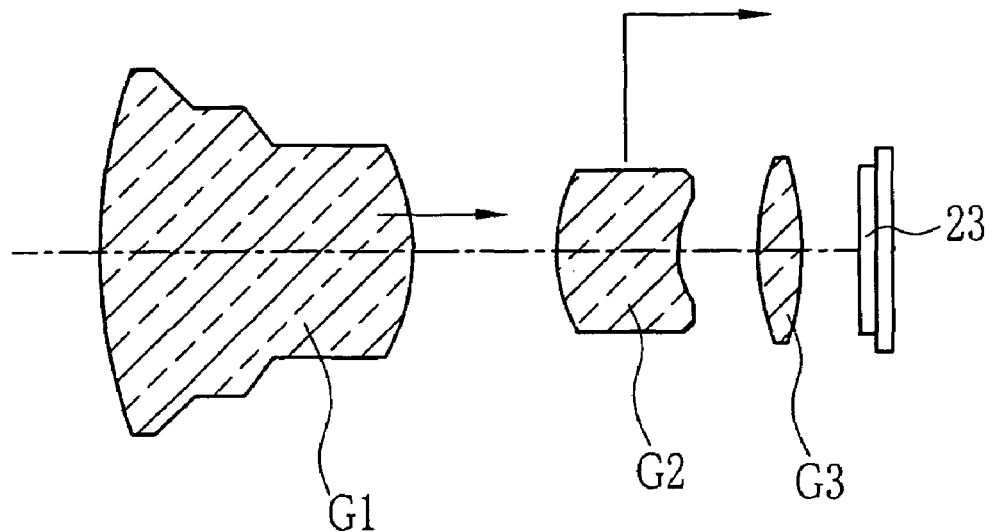
FIGS. 7A and 7B are explanatory diagrams illustrating an optical system of a lens device according to a second embodiment, wherein a retired lens moves backward.
Figure 7B:
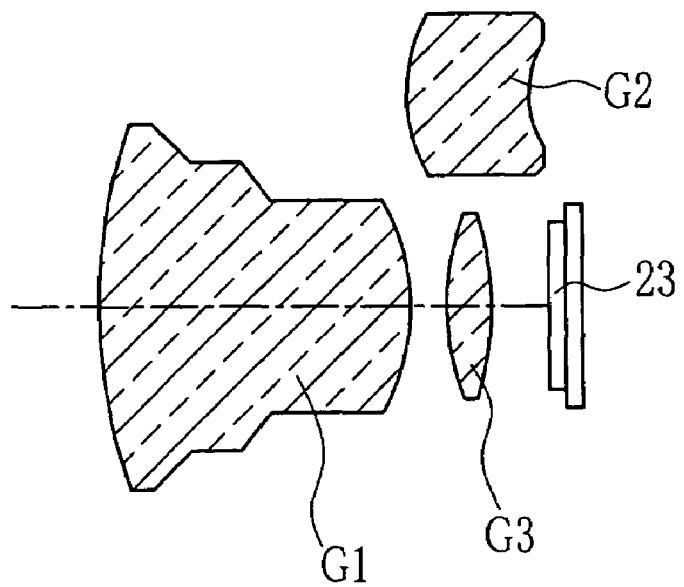

Note that the second lens group G2 may be movable not only in the perpendicular plane to the optical axis A1, but also in parallel to the optical axis A1, as shown in FIG. 7. In that case, the second lens group G2 is moved-out of the optical path in the perpendicular plane to the optical axis A1 and, thereafter, moved backward to be accommodated in a peripheral position of the third lens group G3. The taking lens 5 is not to be limited to a single focus lens but may be a zoom lens. Although the taking lens 5 is mounted integrally with the camera body 3 in the illustrated embodiment, the present invention is applicable to a lens device that is removably attachable to a camera body.

Next, a second embodiment will be described with reference to FIGS. 8 and 9. A lens barrel 50 of the second embodiment consists of a movable lens barrel 20 movable back and forth and an immovable lens barrel 21 holding the movable lens barrel 20. A taking lens 5 consists of a first or front lens group G1 held in the movable lens barrel 20, and a second or rear lens group G4 that is moved along an optical axis A1 of the taking lens 5 for focusing. A lens frame 51 holding the second lens group G4 is supported by a guide shaft 52 and a screw shaft 53 inside the immovable lens barrel 21. The guide shaft 52 and the screw shaft 53 are mounted in parallel to the optical axis A1. The lens frame 51 is in mesh with the screw shaft 53. A focusing motor 54 is coupled to one end of the screw shaft 53. Driving the focusing motor 54 rotates the screw shaft 53, which causes the lens frame 51 to move in parallel to the optical axis A1 while sliding along the guide shaft 52.

A CCD image sensor 55 is disposed behind the taking lens 5. The CCD image sensor 55 is movable in a perpendicular plane to the optical axis A1, by use of an image sensor shift mechanism 56 that is mounted behind the immovable lens barrel 21. The image sensor shift mechanism 56 displaces the CCD image sensor 55 out of an optical path of the taking lens 5 as the lens barrel 50 retreats. Then, the second lens group G4 is moved backward into a room that is given by removing the CCD image sensor 55 from the optical path. The first lens group G1 is moved backward so far as it does not come into contact with the second lens group G4. Thereby, the movable lens barrel 20 retreats into a rest position where a front face of the movable lens barrel 20 is substantially flat to a front surface of a camera body 3.

Figure 9:
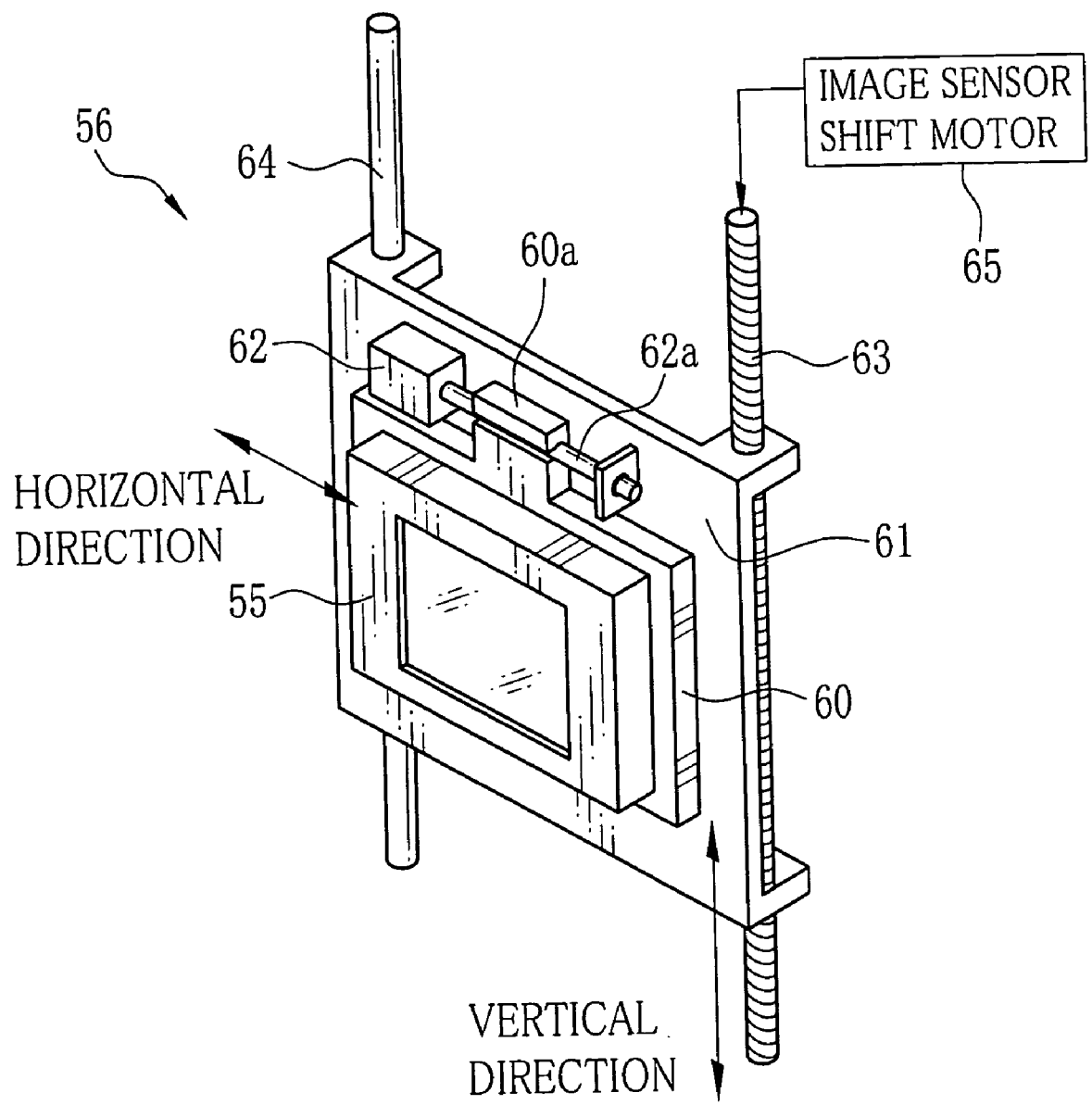
FIG. 9 is a perspective view illustrating an image sensor shifting mechanism of the third embodiment.

In FIG. 9, the image sensor shift mechanism 56 is provided with a first supporting plate 60 for supporting the CCD image sensor 55, and a second supporting plate 61 for supporting the first supporting plate 60. An actuator 62 made of a piezoelectric element is mounted on a front of the second supporting plate 61. The first supporting plate 60 is provided with a rod supporter 60a that is frictionally coupled to a driving rod 62a of the actuator 62. The actuator 62 deforms when a drive pulse is applied. Depending upon the direction of the voltage of the drive pulse, the actuator 62 expands or contracts, to displace the driving rod 62a linearly in a horizontal direction. With the rod supporter 60a being frictionally coupled to the driving rod 62a, the first supporting plate 60 moves in the horizontal direction following to the driving rod 62a. As the first supporting plate 60 is fixed to the CCD image sensor 55, the CCD image sensor 55 moves in the horizontal direction with the displacement of the driving rod 62a.

The second supporting plate 61 is supported by a screw shaft 63 and a guide shaft 64, which are mounted to the immovable lens barrel 21. The screw shaft 63 and the guide shaft 64 extend in a vertical direction. The screw shaft 63 is coupled to an image sensor shift motor 65, so the screw shaft 63 is rotated by driving the image sensor shift motor 65. The second supporting plate 61 is in mesh with the screw shaft 63, so the rotation of the screw shaft 63 causes the second supporting plate 61 to move in the vertical direction while sliding along the guide shaft 64. Together with the second supporting plate 61, the first supporting plate 60 and the CCD image sensor 55 move in the vertical direction. Thereby, the CCD image sensor 55 can move between an inserted position inserted in an optical path of the taking lens 5, and a removed position set out of the optical path. If the screw shaft 63 and the guide shaft 64 are spaced apart from each other so widely, the second lens group G4 can be moved back to a position between the screw shaft 63 and the guide shaft 64, as the movable lens barrel 20 retreats.

Figure 10:
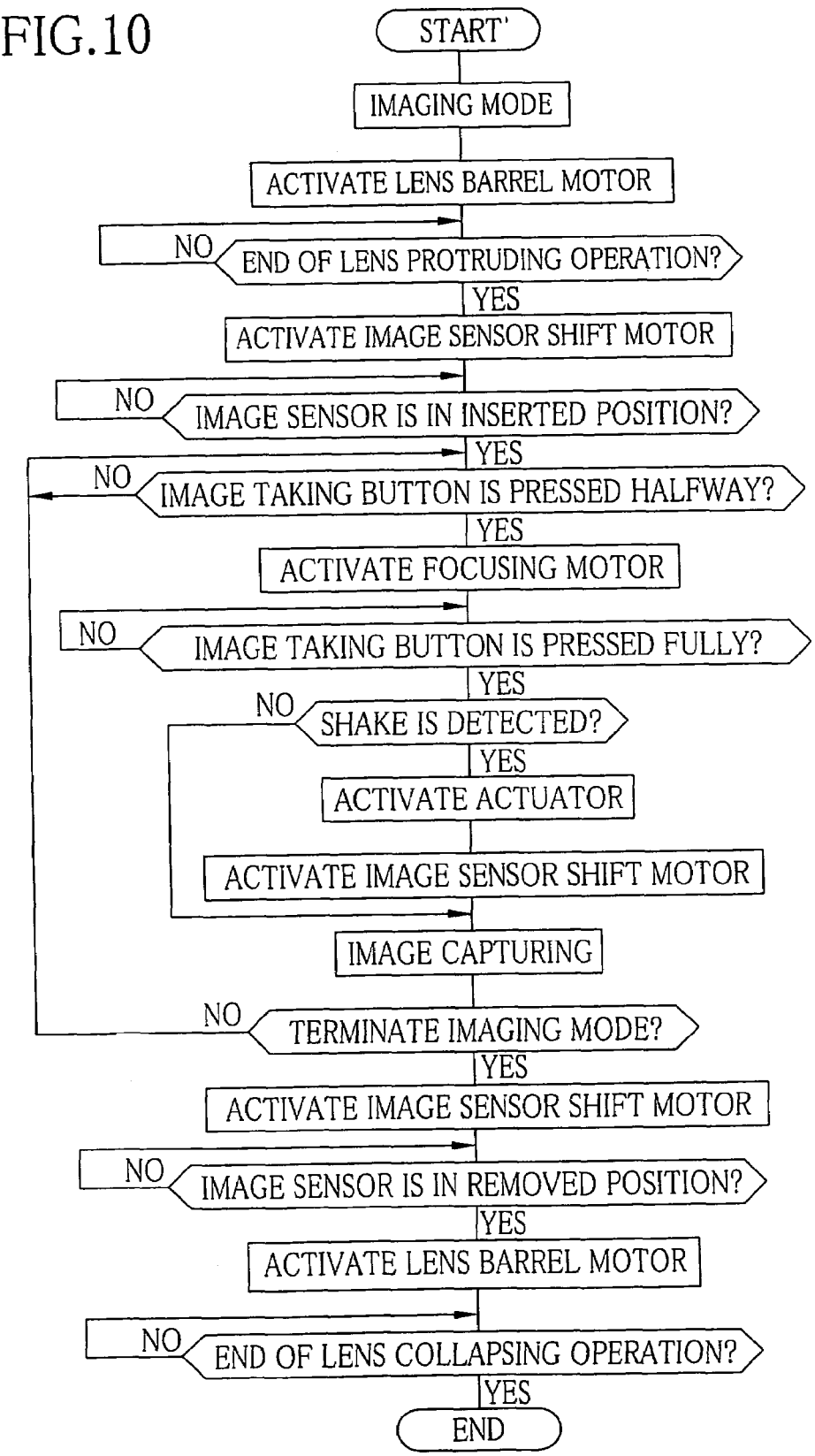
FIG. 10 is a flow chart illustrating an operation sequence in an imaging mode of the digital still camera of the third embodiment.

Now the operation of the second embodiment will be described with reference to FIG. 10, wherein details of the same processes as described with respect to the first embodiment will be omitted. When a power switch is on and the imaging mode is selected, the movable lens barrel 20 protrudes forward to get ready for imaging. As the movable lens barrel 20 protrudes, the focusing motor 54 is driven to move the lens frame 51 forward. When the lens frame 51 is moved forward, the image sensor shift motor 65 is driven to rotate the screw shaft 63. As a result, the second supporting plate 61 is moved upward to move the CCD image sensor 55 from the removed position to the inserted position.

When an image capturing operation is done, an image is captured after the focusing. If the shake sensor 49 detects some shake during the imaging, a driving amount for the actuator 62 and a driving amount for the image sensor shift motor 65 are calculated based on the direction and the magnitude of the shake, so the actuator 62 and the image sensor shift motor 65 are driven in accordance with the calculated amounts. Thereby, the CCD image sensor 55 moves in the perpendicular plane to the optical axis Al, in the horizontal and vertical directions, so as to compensate for a momentary deviation of the optical image on the photoelectric conversion surface of the CCD image sensor 55, that is caused by the camera shake.

When the imaging mode is terminated or the power switch is turned off, the movable lens barrel 20 is moved back into the camera body 3. While the movable lens barrel 20 is being moved backward, the image sensor shift motor 65 is driven to move down the second supporting plate 61. Thereby, the CCD image sensor 55 is moved out of the optical path. The amount of driving the image sensor shift motor 65 is always monitored, so that the CCD image sensor 55 is always set in the same inserted position or in the same removed position. After the CCD image sensor 55 is set in the removed position, the focusing motor 54 is driven to move the lens frame 51 backward, till the lens frame 51 is placed in the room the CCD image sensor 55 left. Simultaneously with the lens frame 51, the movable lens barrel 20 is moved backward and collapsed into the camera body 3. During the lens collapsing operation, the movable lens barrel 20 will not interfere with the lens frame 51, and the lens frame 51 will not interfere with the CCD image sensor 55.

It is possible design the image sensor shift mechanism 56 to move in the perpendicular plane to the optical axis by composing a linear movement and a circular movement, like in the first embodiment.

Although the present invention has been described with respect to the preferred embodiments applied to the digital camera, the present invention is applicable to a video camera or a silver-salt film camera. Among the silver-salt film cameras, the present invention is preferable for those using cut-sheet films rather than those using roll films, so that the camera may not need a large space for moving the film. Furthermore, the present invention is applicable not only to an image forming optical system but also to an a focal optical system for a viewfinder or binoculars.

Thus, the present invention is not to be limited to the above embodiments but, on the contrary, various modifications will be possible without departing from the scope of claims appended hereto.

What is claimed is:

1. A camera comprising:
    a camera body;
    a lens optical system having a plurality of lens elements;
    a lens moving device for moving at least one of said plurality of lens elements along an optical axis of said lens optical system, toward an object side to elongate a total length of said lens optical system in a lens protruding operation, or toward an image side to shorten the total length of said lens optical system in a lens collapsing operation;
    a shake detection device for detecting a shake of said camera;
    a movable device movable in a perpendicular plane to the optical axis of said lens optical system, said movable device being used for compensating for a deviation of an optical image formed through said lens optical system, the deviation resulting from the shake of said camera;
    a first control device for moving said movable device to an inserted position inserted in an optical path of said lens optical system with said lens protruding operation, or to a removed position out of said optical path with said lens collapsing operation; and
    a second control device that calculates an amount and direction of movement of said movable device necessary for canceling the deviation of said optical image when said shake detection device detects the shake, said second control device causing said movable device to move by said calculated amount in said calculated direction;
    wherein the first control device is connected to the camera body and the second control device is connected to the first control device or the camera body,
    wherein said movable device compensating for the deviation constitutes a component of said lens optical system in said inserted position and said second control device comprises a linear displacing device for displacing said movable device linearly in a radial direction to a circular direction about a pivotal point that is located outside said lens optical system.

2. A camera as claimed in claim 1, wherein said movable "device is a compensation lens, and said second control device" comprises a rotary displacing device for displacing said compensation lens in said circular direction about said pivotal point that is located outside said lens optical system.

3. A camera as claimed in claim 2, wherein said rotary displacing device doubles as said first control device.

4. A camera as claimed in claim 3, wherein said rotary displacing device comprises a mechanism for rotating a lens frame of said compensation lens about a supporting shaft that extends in parallel to the optical axis of said lens optical system, and said linear displacing device comprises a mechanism for elongating or shortening an arm that couples said lens frame to said supporting shaft.

5. A camera comprising:
    a lens optical system having a plurality of lens elements;
    a lens moving device for moving at least one of said plurality of lens elements along an optical axis of said lens optical system, toward an object side to elongate a total length of said lens optical system in a lens protruding operation, or toward an image side to shorten the total length of said lens optical system in a lens collapsing operation;
    a shake detection device for detecting a shake of said camera;
    a movable device movable in a perpendicular plane to the optical axis of said lens optical system, said movable device being used for compensating for a deviation of an optical image formed through said lens optical system, the deviation resulting from the shake of said camera;

a control device for moving said movable device to an inserted position inserted in an optical path of said lens optical system with said lens protruding operation, or to a removed position out of said optical path with said lens collapsing operation and that calculates an amount and direction of movement of said movable device necessary for canceling the deviation of said optical image when said shake detection device detects the shake, said control device causing said movable device to move by said calculated amount in said calculated directions, wherein said movable device compensating for the deviation constitutes a component of said lens optical system in said inserted position and said control device comprises a linear displacing device for displacing said movable device linearly in a radial direction to a circular direction about a pivotal point that is located outside said lens optical system.

6. A camera as claimed in claim 5, wherein said control device comprises a rotary displacing device for displacing said movable device in said circular direction about said pivotal point that is located outside said lens optical system.

7. A camera as claimed in claim 6, wherein said rotary displacing device comprises a mechanism for rotating a lens frame of said movable device about a supporting shaft that extends in parallel to the optical axis of said lens optical system and said linear displacing device comprises a mechanism for elongating or shortening an arm that couples said lens frame to said supporting shaft.

* * * * *